(12) United States Patent
Yadav et al.

(10) Patent No.: US 10,819,818 B2
(45) Date of Patent: *Oct. 27, 2020

(54) SMART FACTORY APPLICATION INTEGRATION

(71) Applicant: Bank of America Corporation, Charlotte, NC (US)

(72) Inventors: Durgesh Singh Yadav, Hardoi (IN); Girish Kumar Kakanur, Hyderabad (IN); Goverdhan Reddy Nookala, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/569,803

(22) Filed: Sep. 13, 2019

(65) Prior Publication Data

US 2020/0007640 A1    Jan. 2, 2020

Related U.S. Application Data

(63) Continuation of application No. 15/695,083, filed on Sep. 5, 2017, now Pat. No. 10,419,570.

(51) Int. Cl.
| | | |
|---|---|---|
| G06F 15/16 | (2006.01) | |
| H04L 29/08 | (2006.01) | |
| H04L 29/06 | (2006.01) | |
| G06F 9/44 | (2018.01) | |
| G06F 9/451 | (2018.01) | |

(52) U.S. Cl.
CPC ............ *H04L 67/2823* (2013.01); *G06F 9/44* (2013.01); *G06F 9/451* (2018.02); *H04L 29/06* (2013.01); *H04L 67/025* (2013.01); *H04L 67/2838* (2013.01)

(58) Field of Classification Search
CPC . G06F 9/44; G06F 9/451; H04L 29/06; H04L 67/025; H04L 67/2823; H04L 67/2838
See application file for complete search history.

(56) References Cited

U.S. PATENT DOCUMENTS

| | | |
|---|---|---|
| 5,596,702 A | 1/1997 | Stucka et al. |
| 7,043,696 B2 | 5/2006 | Santori et al. |
| 7,721,219 B2 | 5/2010 | Harsh et al. |

(Continued)

*Primary Examiner* — Chris Parry
*Assistant Examiner* — Dixon F Dabipi
(74) *Attorney, Agent, or Firm* — Weiss & Arons LLP; Michael A. Springs, Esq.

(57) ABSTRACT

Systems and methods for selectively enforcing business logic on a plurality of applications have been provided. The system architecture may include one or more systems of record and a plurality of applications running on a plurality of client machines. A smart factory may store customer data and associated logic obtained from a system of record. The logic may include rules governing use of the customer data in an application user interface. The smart factory may transmit the rules to the plurality of applications. Each application may include an application integrator configured to receive the rules and execute an update to enforce the rules on an application user interface. In addition, the smart factory customer data may be accessed by the applications to prevent repeated calls to the systems of record for commonly used information.

19 Claims, 4 Drawing Sheets

(56) References Cited

U.S. PATENT DOCUMENTS

| | | | |
|---|---|---|---|
| 7,941,438 B2* | 5/2011 | Molina-Moreno | G06F 8/35 |
| | | | 707/756 |
| 8,914,733 B2 | 12/2014 | Chai et al. | |
| 9,384,005 B2* | 7/2016 | Paliwal | G06F 13/00 |
| 9,396,232 B1* | 7/2016 | Kapoor | G06Q 10/1091 |
| 9,549,007 B2 | 1/2017 | Chai et al. | |
| 9,864,610 B2* | 1/2018 | Van Der Sanden | G06F 9/451 |
| 9,983,775 B2* | 5/2018 | Jain | G06F 3/04842 |
| 10,331,174 B2* | 6/2019 | Dreessen | G06F 3/0238 |
| 2006/0190374 A1 | 8/2006 | Sher | |
| 2007/0078953 A1* | 4/2007 | Chai | H04L 65/403 |
| | | | 709/219 |
| 2008/0275910 A1* | 11/2008 | Molina-Moreno | |
| | | | G06F 16/2365 |
| 2012/0084412 A1 | 4/2012 | Burns et al. | |
| 2017/0242920 A1 | 8/2017 | Neland | |
| 2017/0289120 A1 | 10/2017 | Kohli | |

\* cited by examiner

SMART FACTORY APPLICATION INTEGRATION

CROSS REFERENCE TO RELATED APPLICATION

This application is a continuation of U.S. patent application Ser. No. 15/695,083 filed on Sep. 5, 2017 and entitled "SMART FACTORY APPLICATION INTEGRATION" which is hereby incorporated by reference herein in its entirety.

FIELD OF TECHNOLOGY

This disclosure relates to smart factory system architecture. In particular, the disclosure relates to using smart factory logic to control user interface behavior for applications running on client machines.

BACKGROUND

An institution or group of institutions may rely on a set of computer-based applications for performing tasks related to the institution. These applications may be spread across disparate local environments with different interfaces. For example, a financial institution may maintain hundreds of applications across multiple banking channels.

Many of the applications may incorporate similar functionalities and perform similar tasks. For example, a financial institution may maintain multiple applications that require entry of a customer account number.

Development and maintenance of the applications across these disparate environments is difficult and burdensome. Although a particular functionality may be common to multiple applications, any modifications must be separately reproduced within each application. For example, the financial institution may change the format for customer account numbers from a 10-digit format to a 14-digit format. This change may require reconfiguration of entry fields in the user interfaces for different applications to accommodate the additional digits. In order to implement the change, programmers must modify the business logic governing account number entry within each individual application.

Regulatory and compliance requirements often require modifications that affect tasks common to multiple applications. Although the same modification will be implemented across many different applications, each application must be updated separately.

Centralizing shared business logic for a set of institutional applications would provide a single access point to modify or correct rules or procedures. Regulatory requirements could be more efficiently implemented across the set of applications with a single change to the shared business logic.

In addition to shared business logic, the same centralized system could generate further efficiencies by providing shared access to constant data and frequently accessed data across multiple applications.

It would be desirable, therefore, to centralize control over business logic for multiple disparate applications. It would also be desirable to enable modifications to shared business logic that will be implemented across multiple applications. It would be desirable to accomplish this integration with minimal disruption to existing system architecture.

SUMMARY OF THE DISCLOSURE

System architecture for selectively enforcing business logic on a plurality of applications is provided.

The system architecture may include one or more systems of record storing customer data. The system architecture may include a plurality of client applications. The system architecture may include a smart factory in communication with both the systems of record and the plurality of applications.

The smart factory may maintain customer data obtained from one or more of the systems of record in a smart factory entity set. The smart factory may maintain metadata associated with the entity set data. The metadata may include business logic governing display of the entity set data. The business logic may include a plurality of user interface rules.

The smart factory may transmit user interface rules associated with the entity set data to all or part of the plurality of applications. An application integrator may facilitate communication with the smart factory. The application integrator may execute an update to enforce the user interface rules on an application user interface.

The applications may request entity set data from the smart factory. The transmission of entity set data may prevent repeated calls to one or more of the systems of record for commonly used information.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
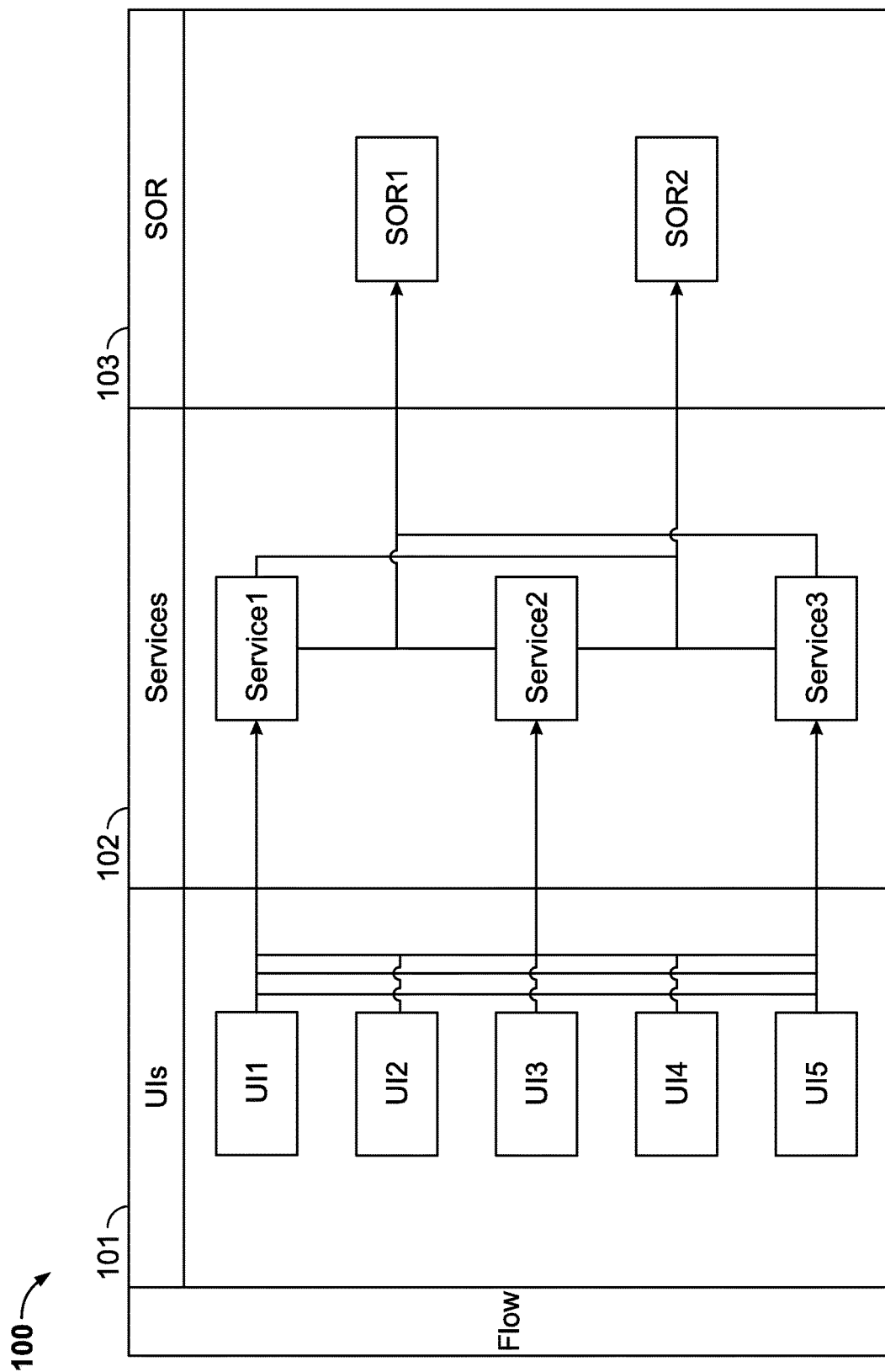
FIG. 1 shows illustrative prior art system architecture.

Apparatus and methods for smart factory style application integration are provided.

Cutting-edge manufacturing procedures involve a "smart factory" in which cloud computing enables centralized logic for individual machines performing specific assembly tasks. Instead of replicating programming at each assembly station, the smart factory machines are integrated in a manner that allows them to access shared logic.

The efficiencies obtained by the smart factory concept translate to other fields as well. An institution or group of institutions may rely on a set of computer-based applications for performing tasks related to the institution. These applications may be spread across disparate local environments with different interfaces.

Many of the applications may incorporate similar functionalities and perform similar tasks. For example, a financial institution may maintain multiple applications that require entry of a customer account number.

Business logic may refer to the underlying processes within a program that carry out the operations between a server and a user interface. Business logic may comprise code that defines the processes to be run and contains the specific calculations or commands needed to carry out those processes. The business logic may include user interface rules that govern display of data in the user interface.

A smart factory may integrate the business logic for a set of institutional applications and provide a single access point to modify or update rules and procedures. Regulatory requirements may be more efficiently implemented across the set of applications with a single change to the shared business logic. The same centralized system may generate further efficiencies by providing shared access to cache memory information and data retrieval procedures across multiple applications.

Smart Factory Interface with Systems of Record

Institutional information may be stored in one or more databases. The databases may be systems of record. Systems of record may store customer information, account information and any other suitable data. Systems of record may store metadata related to the location of data, the source of the data, the formatting of data, compliance rules and regulations governing the data, and any other suitable metadata.

The smart factory may be in communication with one or more systems of record. The smart factory may obtain data from a system of record. The smart factory may obtain metadata associated with the data. The smart factory may temporarily store the data and associated metadata.

The smart factory may store the data and metadata in an entity set. An entity set may be a logical grouping of data entities. For example, an entity set of customer information may include entities such as customer first name, customer last name, street address, zip code, state and country. The entity set may include metadata associated with the customer data. The metadata may include business logic governing use of the customer data. The metadata may function as a logical template for an application user interface that displays the data. The business logic may include user interface rules governing display of the data in an application user interface.

The smart factory may include a mapper component. The mapper component may hold keys for the entity set. The keys may enable the smart factory to locate entity data in response to a call from an application. In some embodiments, the mapper may include a table. The mapper may iterate over the table in response to a request to access an entity. The mapper may use the table to locate the requested entity.

The smart factory may include a cache memory component. The cache memory may store constant data obtained from the systems of record. The cache memory may store variable data, metadata, or any suitable type of data. The cache memory storage may prevent repeated calls to a system of record to return the same data.

The smart factory data may employ eager initialization. Eager initialization may initialize a smart factory entity set with metadata obtained from a system of record. The metadata may include one or more user interface rules governing display of the data. Eager initialization may take place at predetermined intervals.

The smart factory data may employ lazy initialization. Lazy initialization may be triggered by a call from an application to the smart factory for system of record data. The data may be obtained from the system of record and stored in the smart factory cache memory for any future calls. In some embodiments, lazy initialization may be restricted to constant data. In some embodiments, lazy initialization may include metadata.

Smart Factory Interface with Applications

A set of computer-based applications may perform tasks related to the institution. These applications may be spread across disparate local environments with different interfaces. For example, a financial institution may maintain hundreds of applications across multiple banking channels.

The smart factory may interact with multiple applications. An application may be hosted on a client machine. Some or all of the applications may include a user interface. The applications may include business logic that governs the behavior of the user interface. The business logic may be executed by the application. The business logic may include user interface rules governing display of data in the user interface.

The smart factory may enforce business logic governing user interface behavior for multiple applications. The smart factory may enforce user interface rules for multiple applications. The applications may include an integrator component. The smart factory may provide an integrator component to each application. The smart factory may communicate with the integrator component of the application.

The integrator component may download files required to run specific logic from the smart factory and execute it as part of the application itself. The integrator component may download user interface rules from the smart factory. The files may be transmitted from a central server to the client machine. The data may be in text XML format. The data may include business logic associated with a smart factory entity set. The data may include user interface rules governing the display of entity set data in an application user interface. The transmitted business logic may override previously established logic governing the application user interface. The transmitted user interface rules may override previously established user interface rules.

For example, new user interface rules may implement a change in the display for information elements in an application user interface. In one illustrative example, an entry field may be an "int" entry field. The smart factory data may subsequently incorporate percentages that include decimal point numbers. The smart factory may transmit new user interface rules that include a "double" entry field. In another illustrative example, the entry field may be a "big int" entry field including only numeric characters. The smart factory data may incorporate a serial number that also includes alphanumeric characters. The smart factory may transmit new user interface rules that include a "string" entry field.

The smart factory may push data to a client machine running the application. The smart factory may push the data to the applications on a periodic schedule. For example, the smart factory may push data to the application once each day. The data may be batch data. The transmission may be a batch send.

The smart factory may push data to an application when the application is launched. The application may be registered with the smart factory. The smart factory may recognize when the application is launched and may push updated logic to the application. The application may enforce the new logic on the user interface. The integrator component may execute the update.

The applications may subscribe to data from the smart factory. The smart factory may publish data. The smart factory may publish the data intermittently or on a periodic schedule. The subscribing applications may receive a notification of published data. The subscribing applications may pull published data from the smart factory.

The smart factory entity set may include both data and metadata. The interface between the smart factory and the application allows the smart factory to enforce business logic associated with entity set data. The business logic may include one or more user interface rules. The same interface may allow multiple applications to bypass a system of record access data directly from the entity set. The smart factory may increase efficiency by preventing repeated calls to the systems of record by the individual applications.

The smart factory may include an interceptor component. The interceptor may interface between an application and a request manager. The interceptor may be a component of a request manager. The interceptor may authenticate and authorize a call from an application. The interceptor may perform pre-processing on the request. The interceptor may perform post-processing on a response before it is transmitted to the application.

The smart factory may include a request manager. The request manager may process a call from an application and generate a response to the application.

An application may request information related to an entity set. For example, an entity set of customer information may include entities such as customer first name, customer last name, street address, zip code, state and country. An application may call the smart factory to verify customer information entered into the application. The application integrator component may retrieve the entire entity set. Subsequent processing can then take place entirely within the application, without calling the smart factory to verify each individual entity. The smart factory mapper may locate the entity set in response to the request.

The application may request information stored in the smart factory cache memory. The cache memory may store constant data obtained from the systems of record. Storing data in the cache memory prevents repeated calls to a system of record to return the same data. For example, the set of 50 U.S. States is constant data. If the application has established that the customer country is the United States, the available options for a customer state may be accessed through the cache memory.

The smart factory may temporarily store data associated with the request from the application.

The smart factory may include a state component. The state component may maintain the state of the application so that it is correlated with information retrieved from the smart factory. For example, if the application identifies a customer city as "Atlanta," the options for entering the zip code may be limited by the smart factory based on the current state of the application. A zip code that is not associated with the city of Atlanta may not be accepted by the application.

The smart factory may include a session component. The session component may maintain each communication between the smart factory and the application integrator component. The session component may work in concert with the state component.

The smart factory may be integrated into a conventional system with minimal disruption to the system architecture. The smart factory may interface with the systems of record. The smart factory may interface with the applications hosted on client machines. The smart factory may temporarily store data received from an application, data retrieved from the systems of record, metadata related to the stored data, user interface rules, and any other suitable data. The applications may retain independent connections to the systems of record.

In some embodiments, the smart factory may be deployed at a centralized location. In some embodiments, the smart factory may be deployed in a distributed environment. The distributed environment may be maintained by a front controller interceptor. Each instance of the smart factory may serve a different type of entity set. The front controller interceptor may route a request to the correct instance of the smart factory.

The communication between the smart factory and the integrator components may eliminate the need for multiple calls to the smart factory. The communication between the smart factory and the integrator components may eliminate the need for multiple calls to a system of record. The applications may bypass the systems of record to request data directly from the smart factory.

The smart factory may provide flexibility and customization in updating user interface rules for a set of applications. The smart factory may connect to a plurality of applications through integrator components within the applications. The smart factory may selectively update a single application, a fraction of the set of applications, or the entire set of applications.

The smart factory may be employed to test modifications to the user interfaces of one or more applications. The smart factory architecture enables a developer to simultaneously test modifications to the business logic governing multiple applications. The smart factory architecture enables a developer to test modifications to user interface rules for multiple applications.

The smart factory may include a non-transitory machine readable memory. The non-transitory memory may store computer executable instructions. The smart factory may include a processor configured to execute the computer executable instructions. For example, a processor circuit may be embedded in an integrated circuit board of the smart factory. The processor may control overall operation of the smart factory and its associated components.

The smart factory may include RAM, ROM, an input/output ("I/O") module and a non-transitory or non-volatile memory. The I/O module may include a microphone, button and/or touch screen which may accept user provided input. The I/O module may include one or more of a speaker for providing audio output and a display for providing textual, audiovisual and/or graphical output.

Computer executable instructions such as software applications may be stored within the non-transitory memory and/or other storage media. The software may provide instructions to the processor that enable the smart factory to perform various functions. For example, the non-transitory memory may store software used by the smart factory, such as an operating system, application programs, web browser and a database. Alternatively, some or all of computer executable instructions of the data orchestration system may be embodied in hardware or firmware components of the system.

Software application programs, which may be used by the smart factory, may include computer executable instructions for invoking user functionality related to communication, such as email, short message service ("SMS"), and voice input and speech recognition applications. Application programs may utilize one or more algorithms that analyze computational loads processed by the smart factory, computational loads processed devices that access the data orchestration system, filter confidential content or any other suitable tasks.

The smart factory may operate in a networked environment. For example, the smart factory may support network connections to other systems within the complex web and patch servers storing software patches. The smart factory may support establishing network connections to one or more remote computers. Such remote computers may be nodes on a network. The nodes may be personal computers or servers that include many or all of the elements described above relative to the smart factory.

The network connections may include a local area network ("LAN") and a wide area network ("WAN"), and may also include other networks. When used in a LAN networking environment, the smart factory may be connected to the LAN through a network interface or adapter. The communication circuit may include the network interface or adapter.

When used in a WAN networking environment, the smart factory may include a modem or other means for establishing communications over a WAN, such as the Internet. It will be appreciated that the existence of any of various well-known protocols such as TCP/IP, Ethernet, FTP, HTTP and the like is presumed, and the smart factory can be operated in a client-server configuration to permit a user to retrieve web pages from a web-based server. Web browsers can be used to display and manipulate data on web pages.

The smart factory and network nodes may include various other components, such as a battery, a speaker, and antennas (not shown). For example, network nodes may be portable devices such as a laptop, a tablet, chat-bot, a smartphone or any other suitable device for receiving, storing, transmitting and/or displaying relevant information.

The smart factory may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The smart factory may utilize computer-executable instructions, such as program modules, executed by a computer. Generally, program modules include routines, programs, objects, components, data structures, etc. that perform particular tasks or implement particular data types. The smart factory may be operational with distributed computing environments where tasks are performed by remote processing devices that are linked through a communications network. In a distributed computing environment, program modules may be located in both local and remote computer storage media including memory storage devices.

A device that accesses the smart factory that may include one or more features of the smart factory. For example, an accessing device may be a smart phone, desktop computer or other device. The accessing device may be operated by a financial center employee. For example, an applicant may use the accessing device to initiate a request to validate the entry of customer data.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows prior art system architecture 100. Column 101 shows multiple independent applications, each with its own user interface. Column 102 shows middleware that handles requests from an application for data from a system of record. Column 103 shows two systems of record.

Figure 2:
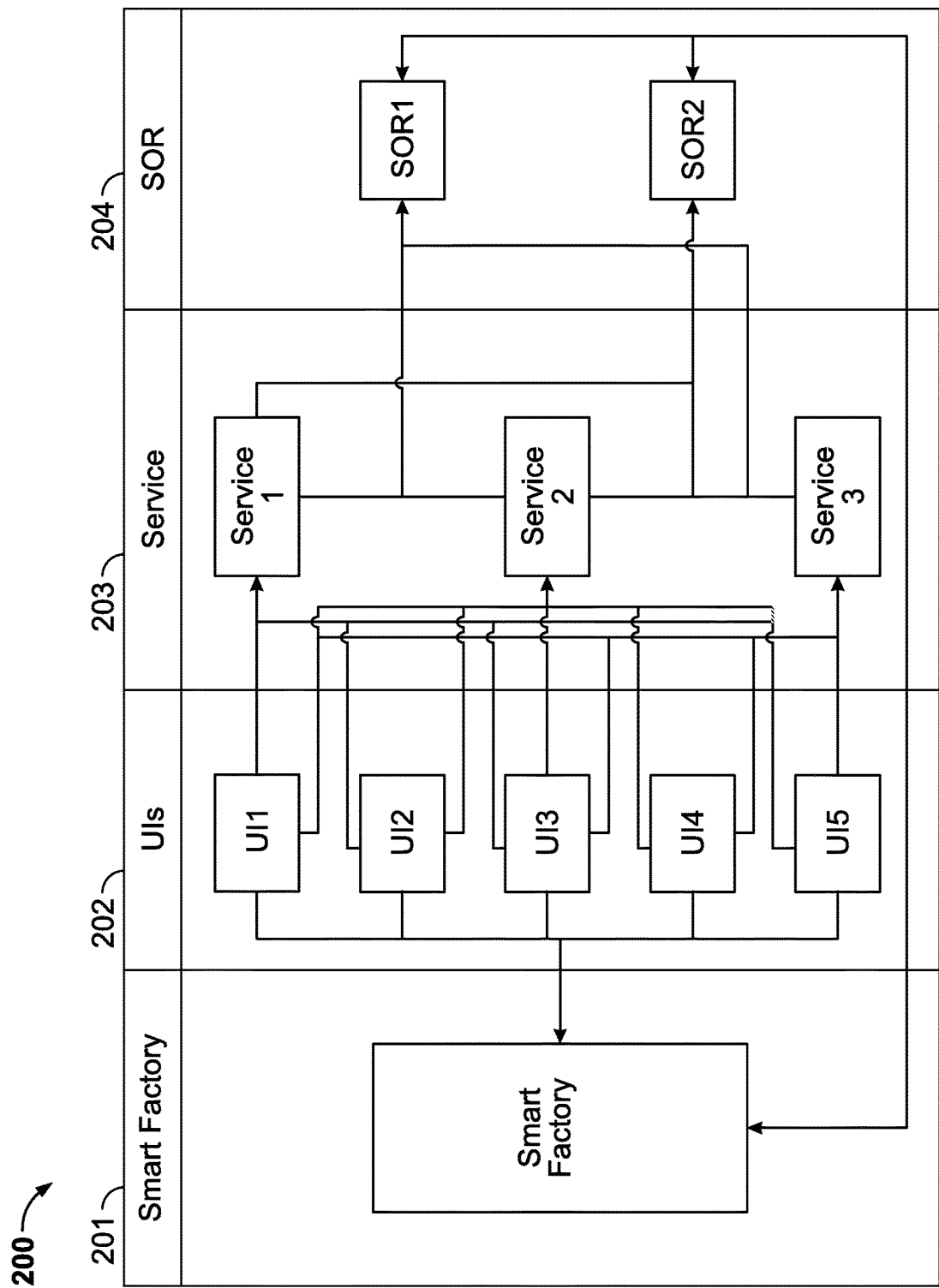
FIG. 2 shows illustrative system architecture in accordance with principles of the invention.

FIG. 2 shows illustrative system architecture 200, incorporating a smart factory. Column 201 shows the smart factory. Column 202 shows multiple independent applications, each with its own user interface. Column 203 shows middleware that handles requests from an application for data from a system of record. Column 204 shows two systems of record.

In system architecture 200, each application maintains the conventional paths for requesting data from a system of record. However, the applications also communicate with the smart factory through an integrator component incorporated into the application. The application integrators may download user interface rules from the smart factory to govern behavior for the application user interface. The smart factory may also obtain frequently accessed information in order to prevent multiple repetitive calls to the system of record from the various applications. All of the applications may access this common data through the smart factory.

Figure 3:
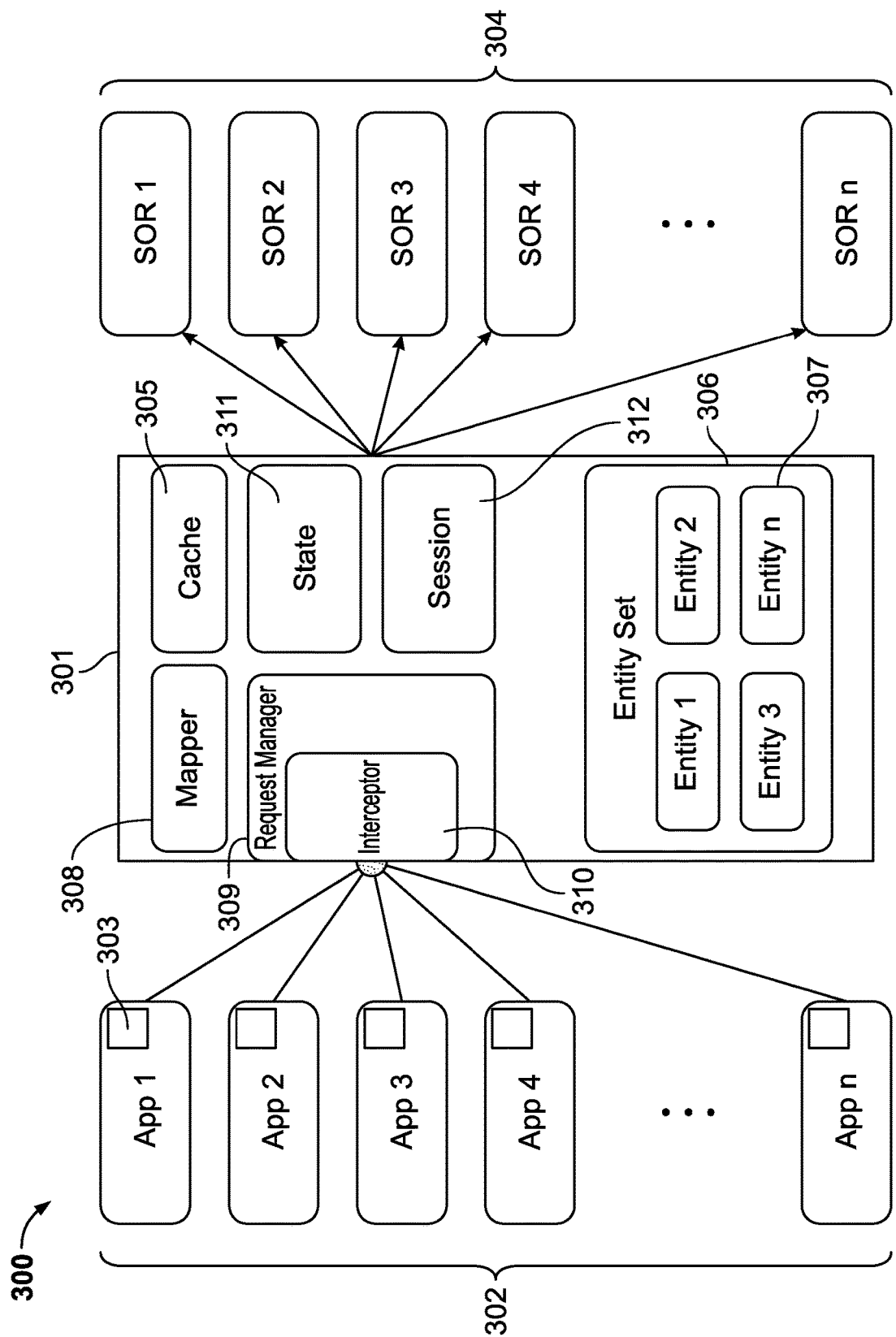
FIG. 3 shows an illustrative system in accordance with principles of the invention.

FIG. 3 shows illustrative smart factory system 300. System 300 may include smart factory 301. Smart factory 301 may communicate with both a plurality of applications and a plurality of systems of record.

Smart factory 301 may interact with applications 302. Each application has an integrator component 303. The integrator component may facilitate communications with the smart factory. The integrator component may download user interface rules or customer data from the smart factory. The integrator component may request customer data from the smart factory.

Smart factory 301 may interact with systems of record 304. The smart factory may obtain data from one or more of systems of record 304. The data may include constant data, variable data, metadata or any suitable type of data. The variable data may be customer data. The metadata may include business logic associated with use of the customer data. The metadata may include user interface rules governing display of the customer data in an application user interface.

Smart factory 301 may maintain data obtained from a system of record in cache memory 305. The cache memory may store constant data, variable data, or any suitable type of data. The cache memory data may be accessed by the applications and may increase efficiency by preventing repetitive calls to the system of record.

Smart factory 301 may maintain data obtained from a system of record in entity set 306. The smart factory may maintain a plurality of entity sets. In some embodiments a plurality of smart factories may function in a distributed environment, with each smart factory specializing in a type of entity set. Entity set 306 may include entities 307. Each entity may be a particular type of data. For example, an entity set of customer information may include entities for customer first name, customer last name and customer address.

Smart factory 301 may include mapper 308. The mapper may hold the keys for the entity sets. In response to a call from an application for data, the mapper may identify the location of the requested data.

Smart factory 301 may include request manager 309. Request manager 309 may include interceptor 310. Interceptor 310 may receive a request for data from an application. Interceptor 310 may validate the source of the request. Interceptor 310 may perform pre-processing on the request. Request manager 309 may handle the request. Interceptor 310 may perform post-processing on the request. Interceptor 310 may transmit the requested data to the requesting application.

Smart factory 301 may store information related to the request. State component 311 and session component 312 may maintain the state of the application during a request so that the user interface is configured to receive and display the requested data.

Figure 4:
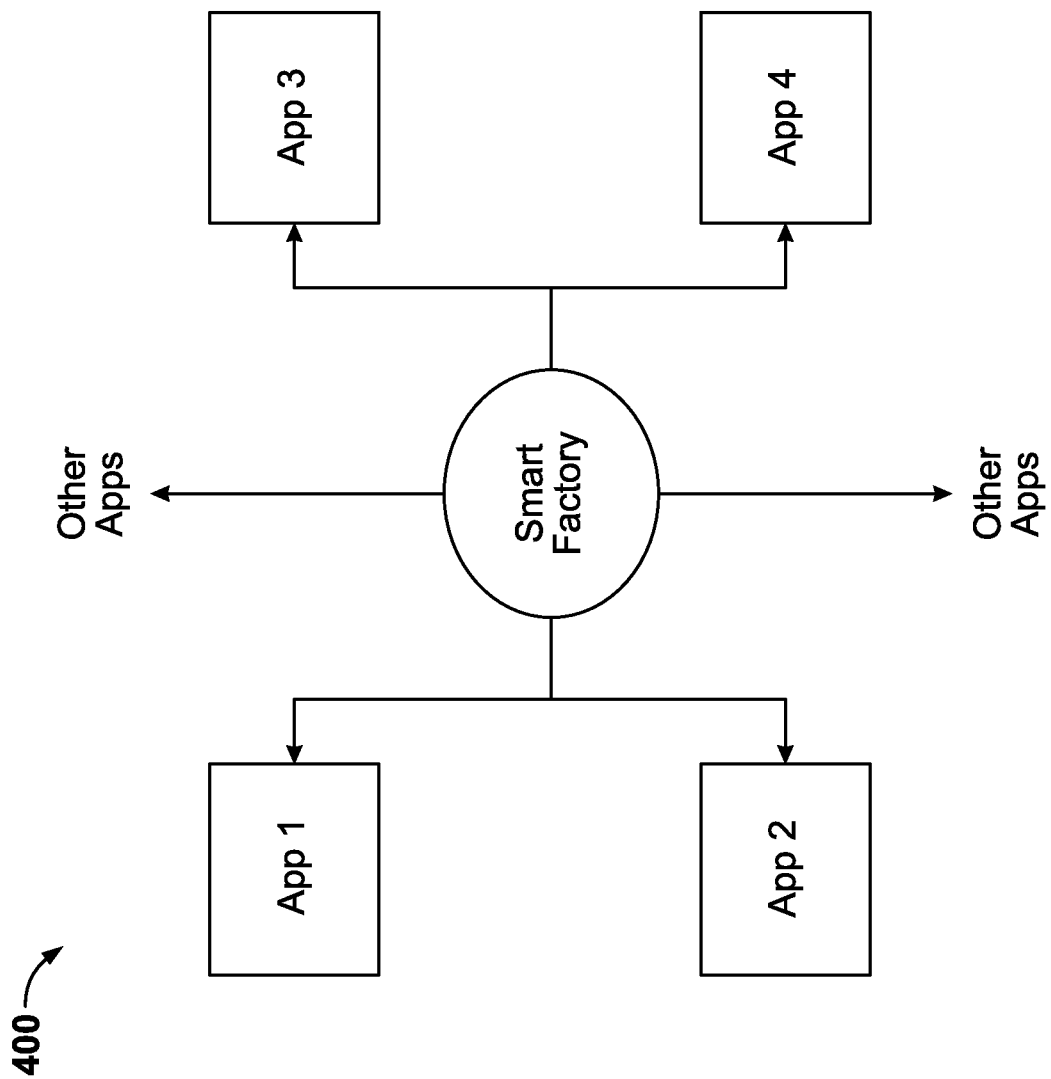
FIG. 4 shows an illustrative system in accordance with principles of the invention.

FIG. 4 shows illustrative smart factory system 400. System 400 illustrates the use of a smart factory to update a variety of applications associated with a financial institution. The financial institution may maintain different remote client applications that perform a variety of institutional functions. Exemplary App 1 may be used by a customer service agent at a financial center to open a new customer account. Exemplary App 2 may be used by a customer in an online banking portal to review account information. Exemplary App 3 may be a voice recognition prompt program for use in a customer service center. Exemplary App 4 may be a program for tracking performance of banking center employees. Each of the applications may include a user interface that captures account details. The smart factory enables the financial institution to modify the behavior of these disparate user interfaces from one centralized location.

Thus, systems and methods for selectively enforcing business logic on a plurality of applications have been provided. Persons skilled in the art will appreciate that the present invention can be practiced by other than the described embodiments, which are presented for purposes of illustration rather than of limitation. The present invention is limited only by the claims that follow.

What is claimed is:

1. A method for selectively enforcing business logic on a plurality of different applications using smart factory system architecture, the system architecture comprising one or more processors executing instructions stored in memory, the method comprising:
   maintaining a smart factory in communication with both one or more systems of record and a plurality of different applications running on a plurality of client devices, each application comprising an application-specific user interface;
   storing a smart factory entity set obtained from the one or more systems of record, the entity set comprising customer data and one or more user interface rules governing use of the customer data; and
   transmitting one or more user interface rules from the entity set to one or more of the plurality of different applications, each application hosted on a remote client machine, each application comprising:
   an application-specific user interface; and
   an integrator configured to receive the user interface rules from the smart factory and execute an update to enforce the user interface rules on the application-specific user interface;
   wherein:
   each application is configured to bypass the system of record and request data from the entity set from the smart factory; and
   the smart factory is configured to transmit an entire entity set to the application in response to a request for one entity from the entity set.

2. The method of claim 1, further comprising initializing the smart factory entity set data with the user interface rules from one or more of the systems of record on a periodic schedule.

3. The method of claim 1, further comprising transmitting the user interface rules to the plurality of applications on a periodic schedule.

4. The method of claim 2, further comprising transmitting the user interface rules from the smart factory to a set of applications comprising fewer than the entire plurality of applications.

5. The method of claim 1, further comprising transmitting the user interface rules from the smart factory to one of the plurality of applications in response to a request from the application.

6. The method of claim 1, wherein one of the user interface rules comprises a rule governing a display format for a customer account number.

7. A method for selectively enforcing a logical template on a plurality of different applications using smart factory system architecture, the system architecture comprising one or more processors executing instructions stored in memory, the method comprising:
   storing customer data and metadata associated with the customer data in one or more systems of record;
   running a plurality of different applications on a plurality of client machines, each application comprising a user interface;
   storing in a smart factory, the smart factory in communication with both the one or more systems of record and the plurality of applications:
   an entity set, the entity set comprising the customer data and metadata, the customer data and metadata obtained from one or more of the systems of record;
   a cache memory comprising constant data obtained from one or more of the systems of record;
   transmitting the entity set metadata from the smart factory to the plurality of different applications, the metadata comprising one or more user interface rules governing display of the customer data in each application user interface; and
   in response to a request from one of the plurality of applications:
   bypassing the system of record and transmitting data from the entity set or from the cache memory to the application; and
   transmitting an entire entity set to the application in response to a request for one entity from the entity set.

8. The method of claim 7, wherein each application further comprises an integrator, the integrator configured to receive the user interface rules and execute an update to enforce the user interface rules on the application user interface.

9. The method of claim 8, further comprising transmitting a test user interface rule from the smart factory to the plurality of applications, each of the application integrators configured to execute the test user interface rule on an application.

10. The method of claim 8, further comprising transmitting the user interface rules from the smart factory to an application integrator as batch data on a periodic schedule.

11. The method of claim 8, wherein the smart factory is configured to transmit the user interface rules to an application integrator in response to a call from one of the plurality of applications.

12. The method of claim 7, wherein the smart factory comprises a request manager configured to process the request to access the entity set data, the request manager comprising an interceptor configured to validate the application and perform pre-processing on the request.

13. The method of claim 7, wherein the smart factory comprises a mapper, the mapper holding keys to a location for the entity set data.

14. A method for selectively enforcing business logic on a plurality of different applications using smart factory system architecture, the smart factory system architecture comprising one or more processors executing instructions stored in memory, the method comprising:
using a smart factory:
communicating with one or more systems of record storing customer data and one or more user interface rules governing use of the customer data;
maintaining a smart factory entity set, the entity set comprising the customer data and the one or more user interface rules governing use of the customer data, the customer data and the user interface rules obtained from one or more of the systems of record;
communicating with the plurality of different applications, each application hosted on a remote client machine, each application comprising:
an application-specific user interface; and
an integrator configured to receive the user interface rules from the smart factory and execute an update to enforce the user interface rules on the application-specific user interface;
receiving a request for entity set customer data from one of the plurality of applications, the request bypassing the system of record; and
transmitting the entire entity set to the application in response to a request for one entity from the entity set.

15. The method of claim 14, further comprising initializing the smart factory entity set data with the user interface rules from one or more of the systems of record on a periodic schedule.

16. The method of claim 14, further comprising transmitting the user interface rules to the plurality of applications on a periodic schedule.

17. The method of claim 14, further comprising transmitting the user interface rules from the smart factory to a set of applications comprising fewer than the entire plurality of applications.

18. The method of claim 14, further comprising transmitting the user interface rules from the smart factory to one of the plurality of applications in response to a request from the application.

19. The method of claim 14, wherein one of the user interface rules comprises a rule governing a display format for a customer account number.

* * * * *